(No Model.)

C. F. ELLIOTT.
LATHE CHUCK.

No. 512,283.  Patented Jan. 9, 1894.

WITNESSES
Pell S. Lowrie.
A. S. Lowrie.

INVENTOR.
Charles F. Elliott
By Geo. W. King. ATTORNEY.

UNITED STATES PATENT OFFICE.

CHARLES F. ELLIOTT, OF KENT, OHIO, ASSIGNOR OF ONE-HALF TO JAMES B. MILLER.

LATHE-CHUCK.

SPECIFICATION forming part of Letters Patent No. 512,283, dated January 9, 1894.

Application filed November 11, 1892. Serial No. 451,705. (No model.)

*To all whom it may concern:*

Be it known that I, CHARLES F. ELLIOTT, of Kent, in the county of Portage and State of Ohio, have invented certain new and useful Improvements in Lathe-Chucks; and I do hereby declare the following to be a full, clear, and exact description of the invention, such as will enable others skilled in the art to which it pertains to make and use the same.

My invention relates to improvements in lathe chucks, in which toggle joints are used for compressing the chuck-jaws, with set screws for engaging the jaws whereby the jaws may be made to grasp work that is somewhat eccentric or irregular in form; the arrangement being such that the work may be by hand placed in or removed from the chuck without stopping the lathe, or an automatic, so called, wire feed may be used when desired.

A further object is to provide a simple inexpensive chuck of great grasping power, and that in grasping the work will have no tendency to move the work endwise.

With these objects in view, my invention consists in certain features of construction, and in combination of parts hereinafter described and pointed out in the claim.

Figure 1:
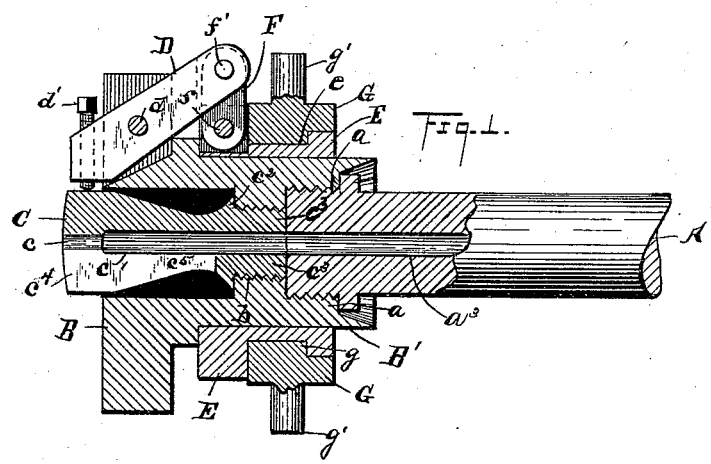
Figure 2:
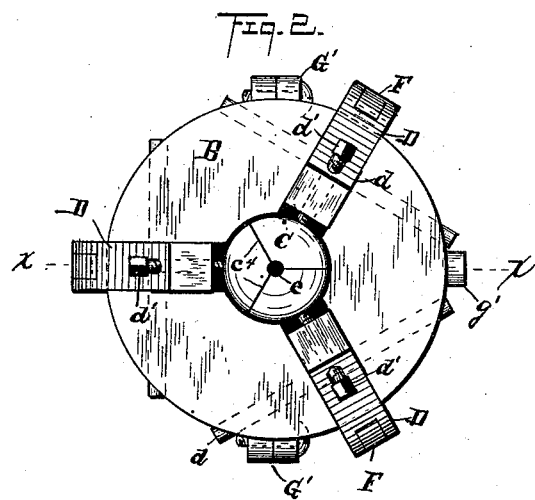

In the accompanying drawings, Figure 1, is a plan partly in central section, of a chuck embodying my invention. Fig. 2 is a front end elevation.

A, represents the lathe spindle; and B, the head or face plate of the chuck; and C, the chuck jaws. Spindle A, is screw threaded externally as at $a$, and has a bore $a^3$ extending through from end to end thereof. Head B, has a long hub B', this hub being bored and screw-threaded internally to engage the externally screwthreaded section, $a$, of the spindle. Hub B' has an internal screwthreaded flange $b$ that abuts the end of the spindle and the internal screw-threads thereof engage the screw-threads of the shank of the chuck jaws hereinafter mentioned. Head, B, is slotted radially, to receive levers, D; there being as many of these levers as there are chuck jaws; in the present instance, three; but of course, the blank from which the jaws are constructed could be slitted into four or more jaws sections if so desired, and in such case there would of course be provided a lever, D, for each jaw section. Levers D, are pivoted at $d$ to head B, so that these levers may tilt in radial planes relative to the spindle. The free end of each lever, D, is provided with a set-screw $d'$, the points of these set-screws engaging the respective jaw sections. E, is a sleeve mounted loosely on hub, B', and the forward section of this sleeve is slotted radially to receive links F. These links are pivoted on pins, $f$, and each link is pivotally connected at $f'$ with the opposing lever D. Sleeve E has an external circumferential groove, $e$, in which groove the internal flange, $g$, of band G, has an easy fit. This band is made in halves, and the halves are fastened together as at G'. Band G has trunnions or lugs as at $g'$, for engaging a forked hand lever (not shown) by means of which sleeve G, is moved endwise. Levers D, and links F, constitute toggle joints, and by shifting sleeve E, endwise, these toggles are operated. The jaws C, are of the ordinary variety, wrought from a solid piece of steel, bored at $c$, to fit the work, and counter bored at $c'$, so that only the face of the jaws will engage the work. The jaws are shouldered at $c^2$ for abutting flange $b$ aforesaid, and the jaws are provided with a screw-threaded shank $c^3$ for screwing into flange $b$. The jaws are slitted as at $c^4$ to separate the free ends thereof, and the latter are reduced in size as at $c^5$ to give a little elasticity to the jaws. For work of different sizes, different jaws are provided. The only difference between the different sets of jaws is in the size of the bore $c$; that, of course, is made to fit the work easily. It will be observed that a set of jaws can be unscrewed and removed and another set substituted, without disturbing any of the other members of the chuck. In the position of parts shown in Fig. 1, the sleeve E, is at the extreme of its movement toward the left hand whereby the links are supposed to have assumed positions perpendicular to the sleeve, in which perpendicular position of the links, the parts maintain their position, holding the jaws closed upon the work. By reversing sleeve E, the chuck jaws are of course opened. By adjusting set-screws, $d'$, the desired pressure may be had for compressing the chuck-jaws sufficient for holding the work as firmly, as may be required, according to the nature thereof. Also by adjusting these screws so as to bear harder on one jaw section than on other jaw sections, the work may be held slightly eccentric to the axis of the chuck, and by adjusting these screws, work somewhat irregular in form may be securely held. Heretofore the construction of this class of chucks was usually such that the jaws were moved endwise in grasping the work, that is to say, the forward ends of the jaws were forced into the conical bore of an opposing cap or other member, whereby the jaws were compressed and thereby caused to grasp the work. Hence when the jaws were compressed so as to gently grasp the work, any further compression of the jaws to grasp the work firmly could only be had, either by sliding the jaws along the work, or, by carrying the work along with the jaws, as the jaws were moved endwise the distance required, as between grasping the work slightly and grasping the work firmly. Such end movement of the work, or any tendency thereof, was, to say the least objectionable, because it interfered with accurately gaging the length of the work. With my improved construction there is no tendency to move the work endwise in grasping it, for the reason that the chuck-jaws are not moved endwise but on the contrary are fixed.

Manufacturers will better appreciate that this chuck can be made at a comparatively small initial cost, and for many kinds of work it will be found convenient and effective. Of course many of the different varieties of automatic or so called wire feeds may be used in connection with this chuck, when so desired.

For some kinds of work I leave out the jaws C and grasp the work by means of set-screws $d'$, and for other kinds of work, I not only leave out the jaws C, but I back or take out screws $d'$, and grasp the work by means of the over-hanging ends of levers D. For instance in turning and boring disks, collars, knobs, &c., by leaving out the jaws C, the chuck will accommodate work of much larger size.

What I claim is—

The combination, in a lathe chuck, of a hollow hub having an internally screw-threaded portion, the clamping jaws adapted to be secured in said portion, the levers fulcrumed in radial slots in said hub, and having adjustable set screws at their outer end, adapted to bear against the jaws, the links pivoted to the rear ends of the levers, and the movable screw sleeve to which the links are pivoted and whereby they may be operated in connection with said levers to form a series of toggle-levers, substantially as specified.

In testimony whereof I sign this specification, in the presence of two witnesses, this 3d day of November, 1892.

CHARLES F. ELLIOTT.

Witnesses:
W. W. REED,
J. B. MILLER.